United States Patent
Kwak et al.

(10) Patent No.: US 6,624,271 B1
(45) Date of Patent: Sep. 23, 2003

(54) PROCESS FOR MAKING A SOLUTION OF COPOLYMERS OF MALEIC ANHYDRIDE AND ALKYL VINYL ETHER IN ISOPROPYL ACETATE OF HIGH SPECIFIC VISCOSITY AND AT A HIGH SOLIDS LEVEL

(75) Inventors: Yoon Tae Kwak, Woodcliff, NJ (US); Stephen L. Kopolow, Plainsboro, NJ (US); Alan J. Carlin, Wayne, NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 10/304,649

(22) Filed: Nov. 26, 2002

(51) Int. Cl.[7] ............................................... C08F 122/04
(52) U.S. Cl. ........................................ 526/271; 526/332
(58) Field of Search .................................. 526/271, 332

(56) References Cited

U.S. PATENT DOCUMENTS 4,952,558 A * 8/1990 Goertz et al. .............. 526/27.1
5,034,488 A * 7/1991 Tazi et al. .................. 526/271
5,874,510 A * 2/1999 Kwak et al. ................ 526/271

* cited by examiner

*Primary Examiner*—Helen L. Pezzuto
(74) *Attorney, Agent, or Firm*—Walter Katz; William J. Davis; Marilyn J. Maue

(57) ABSTRACT

A process for making a solution of a copolymer of maleic anhydride (MA) and methyl vinyl ether (MVE) monomers the specific viscosity (SV) of the product being about 2.5–6, preferably 3–5, indicating a weight average molecular weight of substantially above one million, preferably above 1.5 million and a solids content of about 20–45%, preferably 30–40, in isopropyl acetate (IPAc), solvent includes the steps of (a) precharging part of MVE in IPAc into a reactor heated to about 50–90° C., and then (b) feeding (i) a solution of MA in IPAc, (ii) the rest of MVE, at a mole ratio of MA:MVE of 1:≧1.5 to 1:<3, preferably 1:2.4, and (iii) a free radical initiator dissolved in IPAc, in an amount of 0.02–0.3%, preferably 0.05–0.2%, based on total monomers, into the reactor over time. Powders of such MA/MVE copolymers are made by removing the solvent from the solution.

11 Claims, No Drawings

PROCESS FOR MAKING A SOLUTION OF COPOLYMERS OF MALEIC ANHYDRIDE AND ALKYL VINYL ETHER IN ISOPROPYL ACETATE OF HIGH SPECIFIC VISCOSITY AND AT A HIGH SOLIDS LEVEL

BACKGROUND OF THE INVENTION

1. Field of the Invention

This invention relates to a process of making a copolymer of maleic anhydride and methyl vinyl ether, and, more particularly, to a defined process of making such copolymers in solution having an exceedingly high specific viscosity and at a high solids content.

2. Description of the Prior Art

Goertz, H. et al, in U.S. Pat. No. 4,952,558, described a process of making copolymers of maleic anhydride and methyl vinyl ether in isopropyl acetate as solvent, optionally in the presence of a crosslinking agent, by precharging the maleic anhydride in the solvent, and then metering in the methyl vinyl ether and initiator over tie into the thus-precharged reactor. The copolymerization took place in an open kettle at the boiling point of the solvent. However, only low molecular weights copolymers were obtained in this manner, ranging from a K-value of 48–98, in the working examples, although it was stated that copolymers having K-values of 10–150 were possible. When high molecular weight crosslinked copolymers were desired, it was suggested that both the maleic anhydride and methyl vinyl ether monomers could be taken initially, i.e. as a precharge for the kettle, although none of the examples reflect such conditions. The mole ratio of maleic anhydride to methyl vinyl ether in the process coincided substantially with the 1:1 copolymerization ratio of these monomers, with essentially no excess (less than 10%) of methyl vinyl ether being present. The result was a copolymer of low molecular weight as a solution of low solids content.

Kwak, Y. T. et al, in U.S. Pat. No. 5,874,510, described a related process for making crosslinked maleic anhydride-methyl vinyl ether copolymers by feeding molten maleic anhydride monomer into a precharged mixture of methyl vinyl ether and a crosslinker in isopropyl acetate. The rest of the methyl vinyl ether was fed as a separate stream along with the molten maleic anhydride.

However, neither of these processes are suitable for making copolymers of high specific viscosity and at a high solids content.

Accordingly, it is an object of this invention to provide a new and improved process for making uncrosslinked copolymers of maleic anhydride (MA) and methyl vinyl ether (MVE) monomers, the specific viscosity (SV) of the product being about 2.5–6, preferably 3–5, indicating a weight average molecular weight of substantially above one million, preferably above 1.5 million, as a solution in isopropyl acetate, and at a solids content of about 20–45%, preferably 30–40%, wherein the mole ratio of MA:MVE in the reaction mixture is 1:≧1.5 to 1:<3, preferably about 1:2.4, and the free radical initiator is present in an amount of 0.02–0.3%, preferably 0.05–0.2%, based on total monomers.

A feature of this invention is a process of making copolymers of MA and MVE wherein part of MVE in isopropyl acetate (IPAc) is precharged into a reactor heated to about 50–90° C., and then separate streams of (i) a solution of MA in IPAc, (ii) the rest of MVE, at the defined total mole ratio of MA:MVE, and (iii) a free radical initiator dissolved in IPAc, at a specified concentration, is introduced into the precharged reactor.

Another feature of the invention is the provision of MA-MVE copolymers of high specific viscosity as a powder.

These and other objects and features of the invention will be made apparent from the following more particular description of the invention.

SUMMARY OF THE INVENTION

What is described herein is a process for making a solution of a copolymer of maleic anhydride (MA) and methyl vinyl ether (MVE) monomers, the specific viscosity (SV) of the product being about 2.5–6, preferably 3–5, indicating a weight average molecular weight of substantially above one million, preferably above 1.5 million, and a solids content of about 20–50%, preferably 30–40%, in isopropyl acetate (IPAc), which comprises:

(a) precharging part, preferably half, of MVE in IPAc solvent into a reactor heated to about 50–90° C., preferably 65–75° C., and (b) feeding (i) a solution of MA in IPAc, (ii) the rest of MVE, at a mole ratio of MA:MVE of 1:≧1.5 to 1:<3, preferably 1:2.4 and (iii) a free radical initiator, preferably decanoyl peroxide, dissolved in IPAc, in an amount of 0.02–0.3%, preferably 0.05–0.2%, based on total monomers, into the reactor over time, preferably at least 30 minutes.

Suitably, (i), (ii) and (iii) are fed into the precharged reactor over a period of at least 30 minutes.

Powders of such MA/MVE copolymers are made by removing the solvent from the solution.

DETAILED DESCRIPTION OF THE INVENTION

In suitable embodiments of the invention, the free radical initiator is an acyl peroxide, such as diacetyl peroxide, dibenzoyl peroxide and dilauryl peroxide; aperester, such as tert-butyl perpivalate, and tert-butyl per-2-ethylhexanoate; a peroxide, such as decanoylperoxide a di-tert-butyl peroxide; a percarbonate, such as dicyclohexyl peroxydicarbonate; and an azo compound, such as 2,2'-azobisisobutyronitrile, 2,2'-azobis-(2,4-dimethyl- valeronitrile), 1,1'-azobis-(l-cyclohexanecarbonitrile) and dimethyl-2,2'-azobis-(isobutyrate). A preferred initiator is decanoyl peroxide.

The invention will now be described in more detail with respect to the following working examples.

EXAMPLE 1

A 1-liter autoclave reactor was precharged with 90.6 ml (69.6 g) (1.2 moles) of methyl vinyl ether in 116.4 g isopropyl acetate under a nitrogen atmosphere. Separately Pump A was charged with 117.6 g (1.2 moles) maleic anhydride dissolved in 132 g of isopropyl acetate. Pump B was charged with 108.7 ml (83.5 g) of methyl vinyl ether. Pump C was charged with 0.18 g of decanoyl peroxide (1.44 moles) in 45 g isopropyl acetate. Then ⅔ of the charge in Pump C was added in ⅛ portions every 40 minutes for 2 hours, and then every 30 minutes for another 2 hours. The reactants were held at the reaction temperature for 1 hour at the end of the process. Streams from Pumps A and B were fed separately into the precharged reactor according to the following schedule; set froth below in Table 1.

TABLE 1

| Time (min.) | Temp (° C.) | Pressure (psig) |
|---|---|---|
| 0 | 69 | 59 |
| 40 | 72 | 63 |
| 80 | 71 | 58 |
| 120 | 71 | 57 |
| 150 | 70 | 54 |
| 180 | 70 | 55 |
| 210 | 71 | 55 |
| 240 | 72 | 56 |

Yield of MA/MVE: 190.8 g net
SV: 3.532 (Mw = 1.7 million*)
Reaction Mole Ratio - MA:MVE = 1:2.2
% Solids 34%
*weight average molecular weights

EXAMPLE 2

The procedure of Example 1 was repeated with a precharged 90.6 ml (69.6 g) MVE and 101.2 g IPAc. Separate streams of (i) 117.6 g MA in 90.31 g IPAc; (ii) 126.84 ml (97.44 g) MVE; and (iii) 0.18 g of decanoyl peroxide in 45 g IPAc were fed as before from Pump C into the precharged reactor.

The MA/MVE product had:
SV=4.239 (Mw=1.95 million)
Yield 191.7 g
Reaction Mole Ratio - MA/MVE=1:2.4
% Solids 37%

EXAMPLE 3

The procedure of Example 1 was repeated under the following conditions:

Precharge: 90.6 ml (69.6 g) MVE in 101.2 g IPAc
Streams
  (i) 117.6 g MA in 76.99 IPAc
  (ii) 126.84 ml (97.44 g) MVE
  (iii) 0.18 g Decanoyl peroxide in 45 g IPAc
The MA/MVE product had:
SV=4.760 (Mw=1.95 million)
Yield 184.2 g
Reaction Mole Ratio MA/MVE=1:2.4
% Solids 38%

EXAMPLE 4

As in Example 1:
Precharge 99.66 ml (76.56 g) MVE in 98.11 g IPAc
Streams
  (i) 129.36 g MA in 57.38 g IPAc
  (ii) 139.52 ml (107.18 g) MVE
  (iii) 0.20 g Decanoyl peroxide in 49.52 g IPAc
The MA/MVE reaction product
SV=4.776 (Mw=1.98 million)
Reaction Mole Ratio MA/MVE=1:2.4
% Solids 41%

EXAMPLE 5

The processes of Examples 1–4 included a drying step to remove the isopropyl acetate solvent from the copolymer solution. Accordingly, the solution was filtered and dried at 60° C. under vacuum (10–15 inches Hg) for 2–3 hours. A fluffy, fine copolymer powder product was obtained.

While the invention has been described with particular reference to certain embodiments thereof, it will be understood that changes and modifications may be made which are within the skill of the art. Accordingly, it is intended to be bound only by the following claims, in which:

What is claimed is:

1. A process for making a solution of an uncrosslinked copolymer of maleic anhydride (MA) and methyl vinyl ether (MVE) monomers having a specific viscosity (SV) of about 2.5–6 and a solids content of about 20–45%, in isopropyl acetate (IPAc) solvent, which comprises:
  (a) precharging part of MVE in IPAc into a reactor heated to about 50–90° C.,
  (b) feeding (i) a solution of MA in IPAc, (ii) the rest of MVE, at a mole ratio of MA: MVE of 1:≧1.5 to 1:<3, and (iii) a free radical initiator dissolved in IPAc, in an amount of 0.02–0.3%, based on total monomers, into the reactor over time.

2. A process according to claim 1 wherein said SV is about 3–5.

3. A process according to claim 1 wherein said solids content is about 30–40%.

4. A process according to claim 1 wherein said reactor temperature is about 65–75° C.

5. A process according to claim 1 wherein said mole ratio of MA:MVE reactants is about 1:2.4.

6. A process according to claim 1 wherein said free radical initiator is present in an amount of 0.05–0.2%, based on total monomers.

7. A process according to claim 1 wherein said free radical initiator is decanoyl peroxide.

8. A process according to claim 1 wherein (i), (ii) and (iii) are fed into the precharged reactor over a period of at least 30 minutes.

9. A process according to claim 1 wherein about half of the total MVE in IPAc is precharged.

10. A solution made according to the process of claim 1.

11. A powder made according to the process of claim 1 followed by the step of removing the solvent from the solution.

\* \* \* \* \*